Aug. 26, 1941.   W. P. DALRYMPLE   2,253,690

FILTER

Original Filed Nov. 3, 1933

Inventor,—
William P. Dalrymple,
By William H. DeBusk,
Attorney.

Patented Aug. 26, 1941

2,253,690

UNITED STATES PATENT OFFICE 2,253,690

FILTER

William P. Dalrymple, Elma, N. Y.

Original application November 3, 1933, Serial No. 696,475. Divided and this application February 18, 1938, Serial No. 191,241

4 Claims. (Cl. 210—166)

My invention relates to filters of a type comprising a filtering medium through which the liquid to be cleaned is passed under pressure, the arrangement being such that a body of air is compressed within the filter during its operation adapted at the end of the filtering operation to cause a backward flow of a substantial amount of the liquid through the filtering medium in the reverse direction so as to clean the face of the filtering medium. It is one of the objects of my invention to provide an improved form and arrangement of parts by which such results can be attained, by which the action is made effectively automatic, and in which there shall be no danger under ordinary circumstances that the dirt cleared from the face of the filtering medium shall find its way to the supply of oil or other liquid delivered from the filter at the next subsequent period of operation.

It is one of the objects of my invention to provide in a filter of this type an improved arrangement of housing means and communicating valve parts for controlling the movements of the liquid to be cleaned through the filtering medium. In this connection, it is one of the objects of my invention to provide an improved arrangement by reason of which the assembly of the parts shall be facilitated while at the same time the structure is kept such as to be effective for its filtering purpose.

It is another object of my invention to improve devices of this type in sundry details hereinafter pointed out. The preferred means by which I have accomplished my several objects are illustrated in the accompanying drawing and are hereinafter specifically described. That which I believe to be new and desire to cover by Letters Patent is set forth in the claims.

This application is being filed as a division of my co-pending application, Ser. No. 696,475, filed Nov. 3, 1933.

In the drawing—

Fig. 1 is a central vertical sectional view through my improved filter; and

Fig. 2 is a view similar to the upper portion of Fig. 1 but showing a changed position of certain of the parts.

Referring to the drawing, 10 indicates the upper member and 11 the lower member of a receptacle, such members being connected together in the arrangement shown by a plurality of bolts 12, a suitable gasket 13 being interposed between said casing members. In the arrangement shown, the lower end of the lower casing member 11 is closed by means comprising a fitting 14 provided with a valve 15 by a suitable rotation of which an opening is effected for draining the contents of the receptacle.

My improved receptacle is divided into an inlet chamber 16 and an outlet chamber 17 by means of a filter member 18 held in position by shields 19 and 20 above and below the filtering medium, such shields being formed of rectiulated metal, supporting members 21 and 22 formed of wire mesh being provided between the filtering medium and the shields 19 and 20 respectively.

At the upper end of the filter, I have provided a valve casing 23 which is provided with nipples 24 and 25 extending upwardly through the top wall of the casing member 10, being secured in position by means of suitable nuts mounted by means of screw-threads on said nipples. On its bottom face, the valve casing 23 is provided with a nipple 26 which extends downwardly through the filtering medium member 18 and the shields 19 and 20 and through the top wall of a housing 27 which is open at its lower end into the inlet chamber 16, the housing 27 and the filter supporting parts being held rigidly in position with respect to the nipple 26 by means of nuts mounted by means of screw-threads thereon. In the arrangement shown, the housing 27 comprises a downwardly flared member 27a and a downwardly tapered member 27b connected together at their adjacent edges, being of such size as to hold a substantial quantity of oil or other liquid about the opening in the lower end of the nipple 26.

An opening 28 is also provided in the bottom wall of the housing 23 adjacent to the opening through the nipple 26. Within the housing 23, I have provided a slide valve 29 in the form of a piston and having a circumferential groove 30 in its outer wall. As is clearly shown in dotted lines, the valve 29 is provided with a longitudinal opening 31 through the greater part of its length, being open at the left in the drawing so as to communicate with the nipple 24, an opening 32 being provided through the wall of the piston leading into the groove 30. A coiled spring 33 serves normally to hold the slide valve at the limit of its movement toward the right in the drawing at the end of the cylindrical housing 23 as shown in Fig. 1.

When the parts are in the position as shown in said Fig. 1, the opening through the nipple 26 from the inlet chamber 16 communicates through the groove 30, the opening 32 and the longitudinal opening 31 with the nipple 24 so as to provide for the escape of liquid directly from the inlet chamber 16 through said nipple 24 so as to pass in the usual manner to the bearings to be lubricated. In this position of the parts, the valve 29 shuts off communication between the nipple 25 and the nipple 26. When oil is forced upwardly through the nipple 25 into the housing 23 from the oil pump of the automobile upon which the filter is mounted, the valve 29 is moved by such pressure toward the left into the position as shown in Fig. 2 against the action of the spring 33 so as to provide access between the nipple 25 and the nipple 26. The oil coming downwardly through the nipple 25 is accordingly delivered downwardly through the nipple 26, is forced downwardly about the lower edge of the housing 27, and thence upwardly to and through the filtering medium 18 into the outlet chamber 17, from which the oil escapes through the opening 28, the groove 30, the opening 32, the longitudinal opening 31 of the valve, and the nipple 24, as shown in Fig. 2. By reason of the resistance to the flow of the oil outwardly through the outlet nipple 24, the air trapped in the upper end portion of the receptacle is substantially compressed, such pressure condition continuing throughout the operation of the oil pump of the automobile. When the delivery of oil through the nipple 25 is terminated, as when the motor of the automobile stops operating, the valve 29 returns to the position as shown in Fig. 1 and the pressure in the upper end of the receptacle causes a substantial amount of oil to be forced downwardly through the filtering medium 18 from the outlet chamber to the inlet chamber so as to force a quantity of oil upwardly through the nipple 26, through the valve and through the outlet nipple 24. The relief of the pressure condition through the outlet nipple 24 under such conditions may not be exceedingly rapid, but I have found in practice that when a construction such as is shown in the drawing is used on an automobile for filtering the crank-case oil, with the nipple 24 connected with the bearings of the automobile, a sufficient flow of oil backwardly through the filtering medium is established for effectively cleaning the inlet chamber face of the filtering medium, the dirt and grit from the face of the filtering medium being caused to pass downwardly into the lower end portion of the inlet chamber 16. Inasmuch as the dirt and grit from the face of the filtering medium are forced to pass outwardly about the housing 27, such dirt and grit are prevented from rising with the slow-moving oil for escape through the nipple 26 and into the bearings.

By my improved construction, I have provided a filter which is highly effective and which remains highly effective through a long period of such use as is had ordinarily on an automobile which is started and stopped many times during a day's run. Every time the motor is stopped a partial cleaning of the filtering medium is effected by the reverse flow of the oil, and the filtering medium is thus kept in condition for effective functioning.

While I prefer to employ the form of mechanism as shown in my drawing, it is to be understood that my invention is not to be limited to such form except so far as the claims may be so limited, it being understood that changes might well be made in the form and arrangement of the parts without departing from my invention.

I claim:

1. In a filter, the combination of a receptacle, means comprising a filtering medium for dividing the receptacle into inlet and outlet chambers arranged in such relation that the grit and dirt from the filtering medium when released by an operation of cleaning the filtering medium are adapted to settle into the lower portion of the inlet chamber, an outlet port communicating with the outlet chamber adapted to permit liquid to escape therethrough under pressure, means for delivering liquid to be filtered into said inlet chamber under such pressure as to compress a quantity of air trapped in the receptacle and to cause liquid to escape from the outlet chamber through said outlet port, and valve means controlled by the pressure of the liquid entering the receptacle for controlling the movements of the liquid into and through the receptacle, comprising a cylinder communicating at one end with said means for delivering liquid to the receptacle, means connecting said cylinder at a point adjacent to said one end with said inlet chamber, means connecting the opposite end portion of said cylinder with said outlet port, a port at the intermediate portion of the cylinder opening into said outlet chamber, a valve slidably mounted in said cylinder having a longitudinally extending opening therein, and yielding means adapted normally to hold said piston at the end of said cylinder adjacent to the connection with said inlet chamber in position to close said intermediate port with said two end connections in effective communication with each other through said longitudinal opening, the arrangement being such that when liquid is being delivered under pressure into the receptacle said valve is held at the opposite end of said cylinder so as to permit said liquid to pass through said cylinder to the inlet chamber and so as to permit liquid to pass through said longitudinal opening from said outlet chamber to said outlet port.

2. In a filter, the combination of a receptacle, means comprising a filtering medium for dividing the receptacle into inlet and outlet chambers arranged in such relation that the grit and dirt from the filtering medium when released by an operation of cleaning the filtering medium are adapted to settle into the lower portion of the inlet chamber, an outlet port communicating with the outlet chamber adapted to permit liquid to escape therethrough under pressure, means for delivering liquid to be filtered into said inlet chamber under such pressure as to compress a quantity of air trapped in the receptacle and to cause liquid to escape from the outlet chamber through said outlet port, and valve means controlled by the pressure of the liquid entering the receptacle for controlling the movements of the liquid into and through the receptacle, comprising a cylinder communicating at one end with said means for delivering liquid to the receptacle, means connecting said cylinder at a point adjacent to said one end with said inlet chamber, means connecting the opposite end portion of said cylinder with said outlet port, a port at the intermediate portion of the cylinder opening into said outlet chamber, a valve in the form of a piston slidably mounted in said cylinder and having an opening in its wall adapted to communicate with said intermediate port and an opening longitudinally of the piston for establishing communication between said intermediate port and said outlet port, and yielding means adapted normally to hold said piston at the end of said cylinder adjacent to the connection with said inlet chamber, the arrangement being such that when liquid is being delivered under pressure into the receptacle said liquid passes to the inlet chamber and that under such circumstances the outlet chamber opens through said longitudinal opening in the valve to said outlet port.

3. In a filter, the combination of a receptacle comprising two casing members, a filtering medium having its edge portions interposed between said casing members, means for securing said two casing members together and serving to hold said filtering medium in position so as to provide an inlet chamber and an outlet chamber, a valve housing in the outlet chamber portion of said receptacle having inlet and outlet nipples projecting therefrom and secured in openings through the wall of the outlet chamber casing at opposite ends of the housing and having a third nipple extending from the housing and through said filtering medium so as to open in said inlet chamber, said valve housing having also an opening into said outlet chamber, and a valve in said housing held normally at the fluid entrance end of the housing by a spring and held by the fluid against the action of the spring at the opposite end portion of the housing when liquid is being delivered under pressure to the housing, said valve having a longitudinally extending opening therein through which in one position of the valve said outlet chamber is connected with said outlet port and through which in the other position of the valve said inlet chamber is connected with said outlet port.

4. In a filter, the combination of a housing, means comprising a filtering medium dividing the receptacle into inlet and outlet chambers arranged in such relation that the grit and dirt from the filtering medium when released by an operation of cleaning the filtering medium are adapted to settle into the lower part of the inlet chamber, a valve housing in the outlet chamber portion of said receptacle, means providing inlet and outlet connections with said housing at opposite end portions thereof and opening outside of said receptacle, means providing a third connection with said valve housing and extending through said filtering medium so as to open into said inlet chamber, said housing having also an opening into said outlet chamber, a shield comprising at its upper end portion a downwardly and outwardly flared housing member about the opening of said third connection in said inlet chamber for causing the dirt and grit released from the filtering medium to scatter outwardly away from said opening as it moves downwardly in said inlet chamber, a valve in said valve housing, a spring in said valve housing normally holding the valve at the fluid entrance end of said housing when no fluid is being fed to the housing and adapted to yield for movement of the valve by the fluid to the opposite end of the housing when fluid is being delivered under pressure to the housing, said valve having a longitudinally extending opening therein through which in one position of the valve said outlet chamber is connected with said outlet port and through which in the other position of the valve said inlet chamber is afforded a free open connection with said outlet port.

WILLIAM P. DALRYMPLE.